US008325382B2

(12) United States Patent
Maeno et al.

(10) Patent No.: US 8,325,382 B2
(45) Date of Patent: Dec. 4, 2012

(54) ELECTRONIC APPARATUS FOR SYNTHESIZING IMAGE DATA AND CHARACTER DATA AND METHOD OF CONTROLLING THE ELECTRONIC APPARATUS

(75) Inventors: Tomoharu Maeno, Kanagawa (JP); Tomoki Kurasawa, Tokyo (JP); Shohei Suzuki, Saitama (JP)

(73) Assignee: Sony Corporation, Tokyo (JP)

( * ) Notice: Subject to any disclaimer, the term of this patent is extended or adjusted under 35 U.S.C. 154(b) by 651 days.

(21) Appl. No.: 12/318,420

(22) Filed: Dec. 29, 2008

(65) Prior Publication Data

US 2009/0180130 A1 Jul. 16, 2009

(30) Foreign Application Priority Data

Jan. 15, 2008 (JP) ................................. 2008-006015

(51) Int. Cl.
*G06F 15/00* (2006.01)
*G06F 3/12* (2006.01)
(52) U.S. Cl. ........................ 358/1.2; 358/1.15
(58) Field of Classification Search ................ None
See application file for complete search history.

(56) References Cited

U.S. PATENT DOCUMENTS

| 6,791,624 | B1 * | 9/2004 | Suga ............................. 348/588 |
| 6,924,846 | B2 * | 8/2005 | Ohba et al. .................... 348/584 |
| 7,308,158 | B2 * | 12/2007 | Herbert et al. ................ 382/298 |
| 7,375,768 | B2 * | 5/2008 | Herberger et al. ............ 348/584 |
| 7,868,916 | B2 * | 1/2011 | Kawashima ................ 348/207.2 |
| 2003/0021921 | A1 * | 1/2003 | Debraal et al. ................ 428/34.2 |
| 2005/0046878 | A1 * | 3/2005 | Kido ............................... 358/1.2 |
| 2005/0223309 | A1 * | 10/2005 | Lee et al. ..................... 715/500.1 |
| 2008/0088876 | A1 * | 4/2008 | Tanaka et al. ................. 358/1.15 |

FOREIGN PATENT DOCUMENTS

| JP | 08-063144 A | 3/1996 |
| JP | 2003-067175 A | 3/2003 |
| JP | 2007-139923 A | 6/2007 |
| JP | 2007-274225 | 10/2007 |

OTHER PUBLICATIONS

Japanese Office Action issued Dec. 1, 2009 for corresponding Japanese Application No. 2008-006015.

* cited by examiner

*Primary Examiner* — Gabriel Garcia
(74) *Attorney, Agent, or Firm* — Rader Fishman & Grauer, PLLC

(57) ABSTRACT

An electronic apparatus has a display section displaying an image in a predetermined resolution. The apparatus includes a fetching section fetching image data, a processing section processing the form of characters of character data to be added to the image data fetched by the fetching section, a synthesis section synthesizing the image data fetched by the fetching section and the character data whose character form has been processed, an output section outputting the image data out of the apparatus to display the image in a resolution different from the predetermined resolution, and an output control section for outputting the image data synthesized by the synthesis section to the display section and output section. The processing section processes the form of characters of the character data according to the resolution of the image to be displayed at the destination to which the data are output by the output control section.

5 Claims, 10 Drawing Sheets

ELECTRONIC APPARATUS FOR SYNTHESIZING IMAGE DATA AND CHARACTER DATA AND METHOD OF CONTROLLING THE ELECTRONIC APPARATUS

CROSS REFERENCES TO RELATED APPLICATIONS

The present invention contains subject matter related to Japanese Patent Application JP 2008-006015 filed in the Japanese Patent Office on Jan. 15, 2008, the entire contents of which being incorporated herein by reference.

BACKGROUND OF THE INVENTION

1. Field of the Invention

The present invention relates to an electronic apparatus having display means for displaying an image in a predetermined resolution and a method of controlling the electronic apparatus.

2. Description of the Related Art

In order to allow a user to select an image to be printed, a printing apparatus for printing image data according to the related art displays images to be printed in a QVGA size using, for example, a built-in monitor, and an output terminal may be provided for outputting the images to be printed to an external display apparatus to display the images (see JP-A-2007-274225 (Patent Document 1)).

A digital still camera not only displays images which have been imaged by the camera on a built-in display but also has an output terminal for outputting the images to an external display apparatus to display the images on the apparatus.

As a result of the spread of digital television receivers capable of displaying pictures in resolutions in compliance with HD (High Definition) video standards, there are increasing opportunities to enjoy high-vision pictures at home. An electronic apparatus including display means such as a printing apparatus or digital still camera as described above outputs images to be printed or images obtained by imaging to the digital television receiver as described above, the images being output as high-vision images. Thus, details of the images to be printed or the images obtained by imaging can be checked. This is advantageous especially for the images to be printed in that there is less possibility of finding problems in details of the images after printing them.

SUMMARY OF THE INVENTION

An operation screen for allowing a user to operate an electronic apparatus such as a printing apparatus or digital still camera as described above using a GUI (Graphic User Interface) is normally adapted to the resolution of a display section incorporated in the electronic apparatus. Therefore, when such a screen is displayed using high-vision images on a digital television receiver, a problem arises in that text information is hard to view because characters of the text will appear in a very bold form. On the contrary, in the case that the operation screen is adapted to the resolution of high-vision mages, when the operation screen is displayed on a display section incorporated in the electronic apparatus such as a printing apparatus or digital still camera, a problem arises in that the text information is hard to view because the characters of the text are displayed with blurs.

Under the circumstances, in an electronic apparatus including display means for displaying an image in a predetermined resolution, it is desirable display text information in a form of characters that can be clearly viewed, in accordance with the resolution of a destination for display output.

According to an embodiment of the invention, there is provided an electronic apparatus having display means for displaying an image in a predetermined resolution, the apparatus including fetching means for fetching image data, processing means for processing the form of characters of character data to be added to the image data fetched by the fetching means, synthesis means for synthesizing the image data fetched by the fetching means and the character data whose character form has been processed by the processing means, output means for outputting the image data out of the apparatus to display the image in a resolution different from the predetermined resolution, and output control means for outputting the image data synthesized by the synthesis means to the display means and the output means. The processing means processes the form of characters of the character data in accordance with the resolution of the image to be displayed at a destination to which the data are output by the output control means.

According to the embodiment of the invention, there is provided a method of controlling an electronic apparatus having display means for displaying an image in a predetermined resolution, the method including the steps of fetching image data, processing the form of characters of character data to be added to the image data fetched by the fetching means, synthesizing the image data fetched by the fetching means and the character data whose character form has been processed by the processing means, and outputting the image data synthesized by the synthesis means to the display means and to output means which outputs the image data out of the apparatus to display the image in a resolution different from the predetermined resolution. At the processing step, the form of characters of the character data is processed in accordance with the resolution of the image to be displayed at the destination to which the data are output at the output step.

According to the embodiment of the invention, since character data are processed in accordance with the resolution of the image to be displayed at the destination to which the data are output. The processed character data are synthesized with the image data, and the resultant data are output to the destination. Thus, text information can be displayed in a form of characters in accordance with the resolution of the destination of display output, and the information can therefore be clearly viewed.

DESCRIPTION OF THE PREFERRED EMBODIMENTS

Embodiments of the invention will now be described in detail with reference to the drawings.

Figure 1:
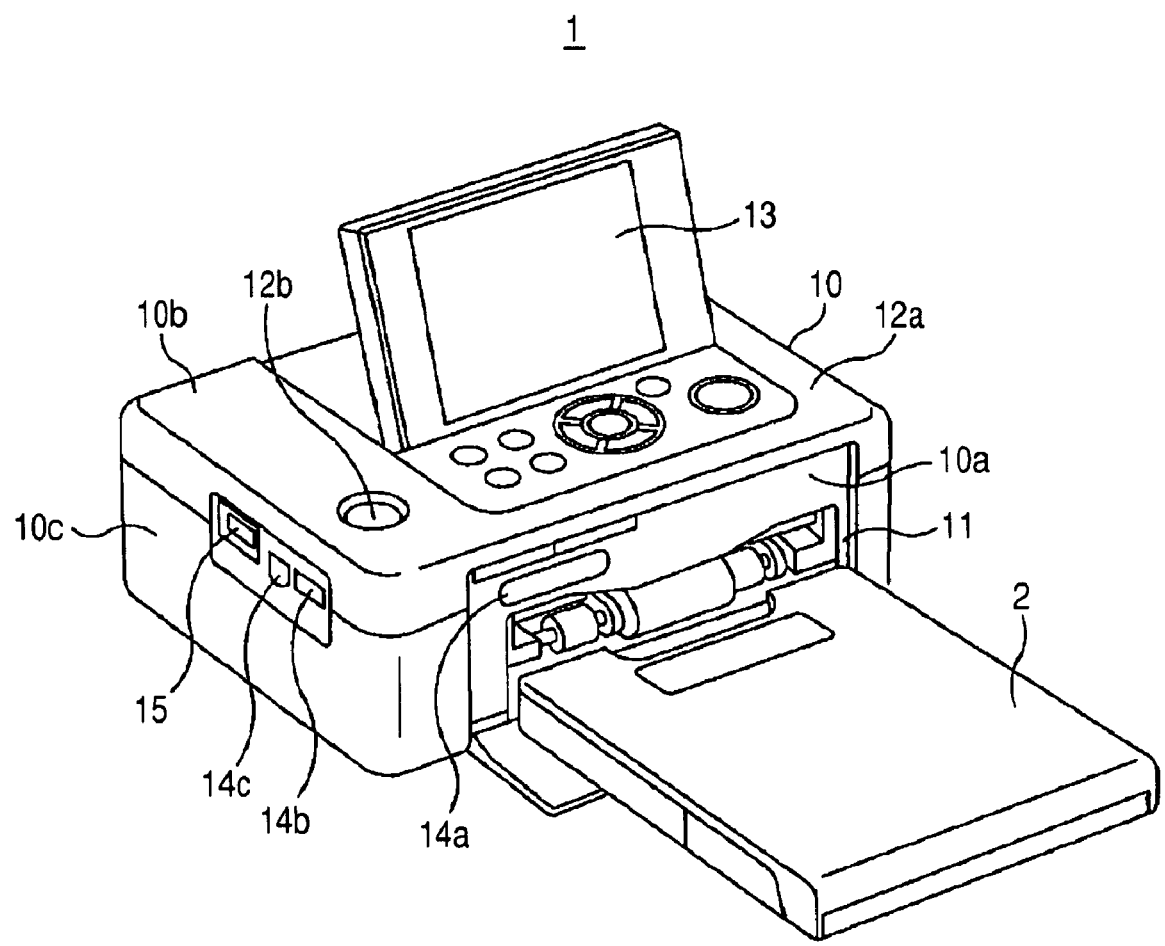
FIG. 1 is an external view of a printing apparatus according to an embodiment of the invention.

The invention may be applied to a printing apparatus which has display means for displaying an image for display associated with image data to be printed. An embodiment of the invention will be described below by taking a printing apparatus 1 as shown in FIG. 1 as an example of such a printing apparatus.

The printing apparatus 1 has an opening 11 formed on a front surface 10a of an apparatus body 10 to allow a paper tray 2 containing sheets of paper to be mounted, and sheets of paper are inserted and discharged to and from the apparatus body 10 at the side of the apparatus where the front surface 10a is located. Operation buttons 12a and 12b and a monitor 13 for displaying an image to be printed are provided on a top surface 10b of the printing apparatus 1. The printing apparatus 1 includes a recording media slot 14a, serving as an external interface, provided on the front surface 10a to allow a recording medium to be inserted. On a side surface 10c of the printing apparatus, input/output terminals 14b and 14c for communication with an external apparatus and a video output terminal 15 for outputting a picture signal in compliance with a high definition video standard such as HDMI are provided.

Figure 2:
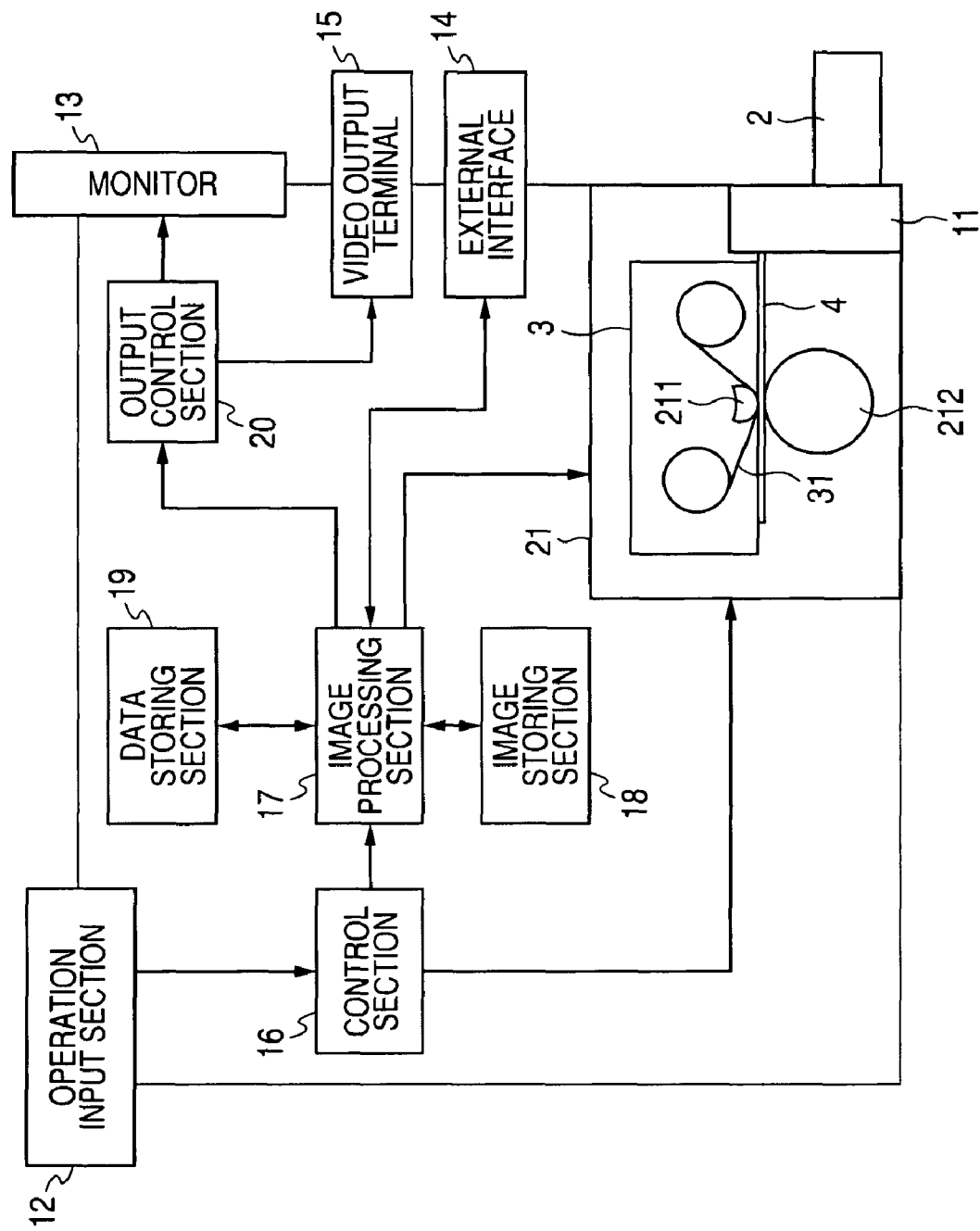
FIG. 2 is a block diagram showing an internal configuration of the printing apparatus according to the embodiment of the invention.

Features provided in the apparatus body 10 of the printing apparatus 1 will be described in detail with reference to FIG. 2.

The printing apparatus 1 includes an operation input section 12, the monitor 13, an external interface 14, the video output terminal 15, a control section 16 for controlling operations of the apparatus as a whole, an image processing section 17 performing image processing on image data to be printed, an image storing section 18 for storing the image data, a data storing section 19 for storing character data, an output control section 20 for controlling the destination to which image data for display is output to be displayed in association with the image data, and a printing process section 21 for printing the image data.

The operation input section 12 is formed by the operation buttons 12a and 12b described above, and the section receives the input of an operation command from a user of the printing apparatus 1 and supplies the operation command to the control section 16.

The monitor 13 is display means for displaying image data for display associated with image data to be printed. For example, the monitor displays image data for display output from the output control section 20, which will be described later, in an image size having a resolution lower than, for example, the high definition video standard applicable to an output from the video output terminal 15. In addition to image data for display associated with image data to be printed, the monitor 13 displays an operation screen for allowing a user to operate the printing apparatus 1.

The external interface 14 is an input/output processing block that is collectively formed by the recording media slot 14a and the input/output terminals 14b and 14c. Image data is input to the interface from outside the apparatus, and the interface supplies the input image data to the image processing section 17.

The video output terminal 15 is a terminal for outputting a picture signal in compliance with a high definition video standard such as HDMI as described above, and it is an example of output means for outputting image data out of the apparatus to display an image in a resolution different from that of the monitor 13. The terminal outputs image data for display output from the output control section 20, which will be described later, to a display apparatus capable of displaying a picture signal in compliance with a high definition video standard.

The control section 16 is control means for controlling operations of the printing apparatus 1 as a whole, and the section controls each part of the apparatus such that operations are performed according operation commands supplied from the operation input section 12 described above. Details of specific control processes performed by the control section 16 will be described later.

For example, the image processing section 17 performs the following operations according to control commands supplied from the control section 16.

The image processing section 17 performs a process for storing image data supplied from the above-described external interface 14 in the image storing section 18. Image data for display have a resolution relatively lower than that of image data to be printed. Therefore, after reading image data to be printed from the image storing section 18, the image processing section 17 performs a reduction process such as pixel thinning on the read image data to convert the data into data for display and supplies the data to the output control section 20. The image processing section 17 also converts image data read from the image storing section 18 into image data for printing and supplies the data to the printing process section 21 which will be described later.

As described above, image data to be printed are stored in the image storing section 18 by the image processing section 17. In addition to image data to be printed, pieces of related information associated with each piece of image data to be printed are stored in the image storing section 18.

Specifically, the pieces of related information stored in the image storing section 18 are imaging time information indicating the time when the image data of interest is imaged and imaging location information indicating the location where imaging is performed acquired by location information acquisition means such as a GPS. Information indicating the shutter speed and the stop value used for imaging the image data of interest may be also stored as related information in the image storing section 18.

The data storing section 19 is storage means for storing character data as described above. For example, text information used on the operation screen is stored. The data stored in the data storing section 19 are read by the image processing section 17.

The output control section 20 is output control means for outputting image data for display supplied from the image processing section 17 to the monitor 13 and the video output terminal 15. Specifically, the output control section 20 supplies a display output to either the monitor 13 or the video output terminal 15. Since the size of images displayed by the monitor 13 is relatively small as described above, when image data for display having a resolution higher than the resolution of the display output of monitor 13 are to be displayed on the monitor 13, the output control section 20 outputs to the monitor 13 the image data of interest supplied from the image processing section 17 after performing a reduction process such as pixel thinning on the data.

The printing process section 21 is thermal transfer type printing means, and the section includes a thermal head 211 and a platen roller 212. An ink ribbon cartridge 3 containing an ink ribbon 31 is mounted in the printing process section 21. The ink ribbon 31 and a sheet of printing paper 4 inserted from the paper tray 2 are transported between the thermal head 211 which is formed with a plurality of heat-generating resistors and the platen roller 212 which is positioned to face the thermal head 211. Thermal energy is applied from the thermal head 211 to the ink ribbon 31 to cause thermal transfer of the dye of the ink ribbon 31 onto the paper 4. Printing is performed as thus described.

The printing apparatus 1 of the present embodiment performs a thermal transfer type printing process as described above. However, the apparatus is not limited to such a process and may perform other types of printing processes such as an inkjet type process.

The printing apparatus 1 having the above-described configuration allows verification of image data to be printed by displaying image data for display associated with the image data to be printed on the monitor 13 incorporated in the printing apparatus 1 or a display connected to the video output terminal 15.

The printing apparatus 1 has not only the function of printing image data stored in the image storing section 18 as described above but also the function of performing various editing processes on image data using the image processing section 17.

Specifically, a process of editing and printing image data includes the following operations.

An operation screen for allowing an arbitrary editing process to be selected from among various editing processes is displayed on the monitor 13 of the printing apparatus 1. A user operates the operation input section 12 of the printing apparatus 1 to select a desired editing process. When a desired editing process is selected, the image processing section 17 of the printing apparatus 1 reads image data from the image storing section 18 and performs the editing process on the data. The edited image data to be printed are output to the printing process section 21.

As thus described, a user can operate the operation input section 12 according to an operation screen displayed on the monitor 13 of the printing apparatus 1 to perform a desired editing process on image data. However, when there is a wide variety of editing processes, complicated operations must be performed to edit image data as desired, and a user will consequently use an editing process in less opportunities.

Figure 3:
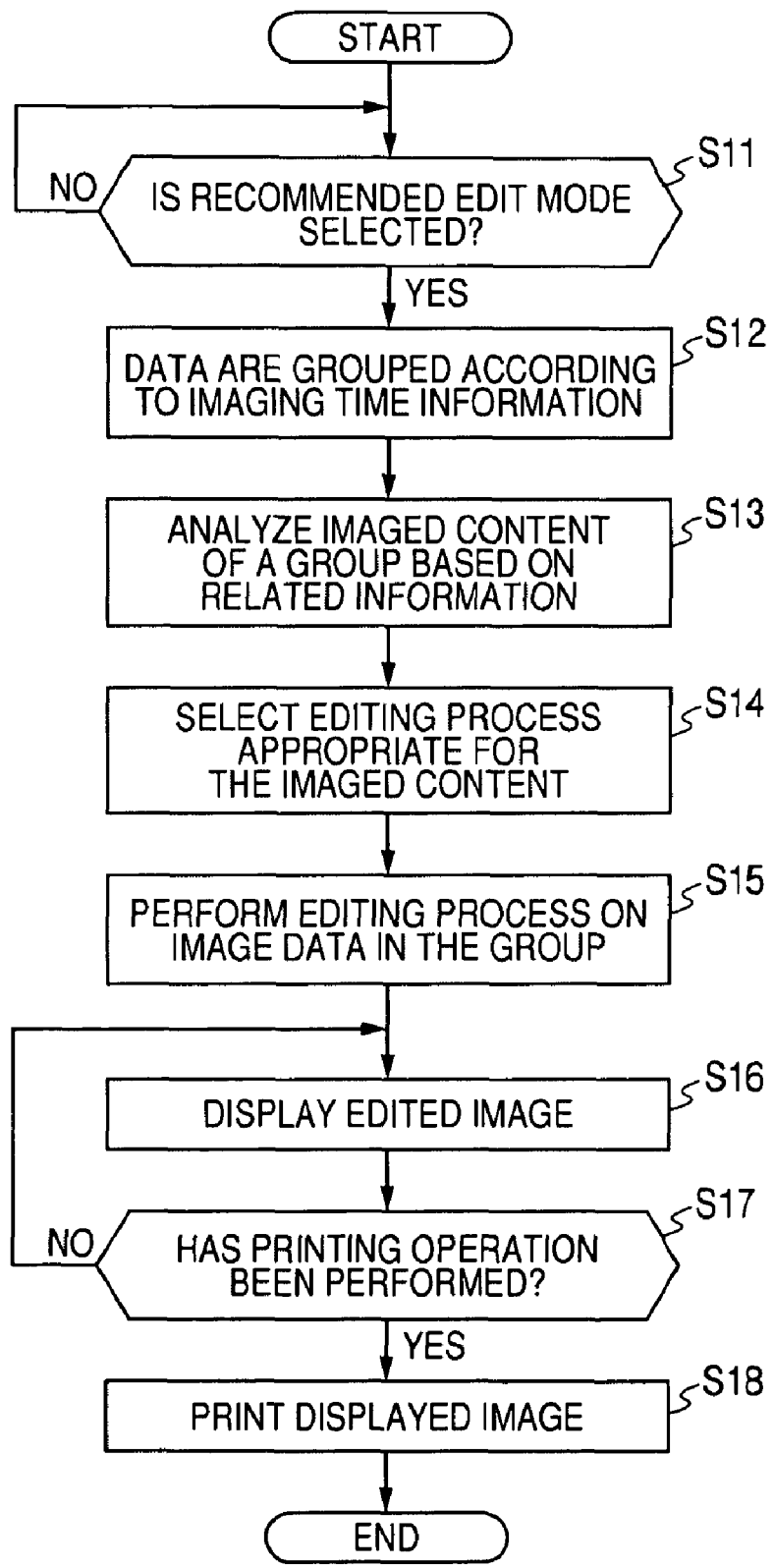
FIG. 3 is a flow chart for explaining processes performed by the printing apparatus when implementing a recommended edit mode.

Under the circumstance, a control process of the printing apparatus 1 of the present embodiment includes the implementation of "recommended edit mode" as shown in FIG. 3 which provides improved user-friendliness.

It is assumed that plural pieces of image data to be printed and information related to each piece of image data have been fetched through the external interface 14 and stored in the image storing section 18 of the printing apparatus 1 before the printing process shown in FIG. 3 is performed. It is also assumed that an operation screen used to operate the printing apparatus 1 is shown on the monitor 13 incorporated in the printing apparatus 1 or the display connected to the video output terminal 15.

At step S11, the control section 16 determines whether "recommended edit mode" displayed on the operation screen has been selected or not based on an operation input from the operation input section 12. The control section 16 repeats this process until "recommended edit mode" is selected. When "recommended edit mode" is selected, the process proceeds to step S12.

At step S12, the control section 16 selects image data from the image storing section 18 based on related information of each piece of image data, and the process then proceeds to step S13. Specifically, the control section 16 categorizes the image data stored in the image storing section 18 into groups of image data based on imaging time information that is related information, for example, each group including pieces of image data imaged on the same day. The control section 16 selects one arbitrary group of image data. For example, the grouping process of the control section 16 may be performed based on imaging location information to categorize image data into groups each including pieces of image data imaged in the same imaging location.

At step S13, the control section 16 analyses the imaged content of the selected group based on the related information of the image data belonging to the group as described below by way of example, and the process thereafter proceeds to step S14.

Specifically, the control section 16 analyses the imaged content of the image data of a group from imaging location information and may conclude that the content has been imaged at a seaside, a ski resort, or a wedding hall in a hotel or the like. The control section 16 also analyses the content of the image data of a group from imaging time information of the related information and may conclude that the content has been imaged at an occasion such as a Christmas party, New Year's Day, Dolls' Festival, or The Seven-Five-Three Festival.

At step S14, the control section 16 selects an editing process which is appropriate for imaged content thus analyzed.

At step S15, the control section 16 controls the image processing section 21 such that the selected editing process is performed on the image data of each group, and the process proceeds to step S16. Specifically, the image processing section 17 may perform editing processes as described below.

Figure 4:
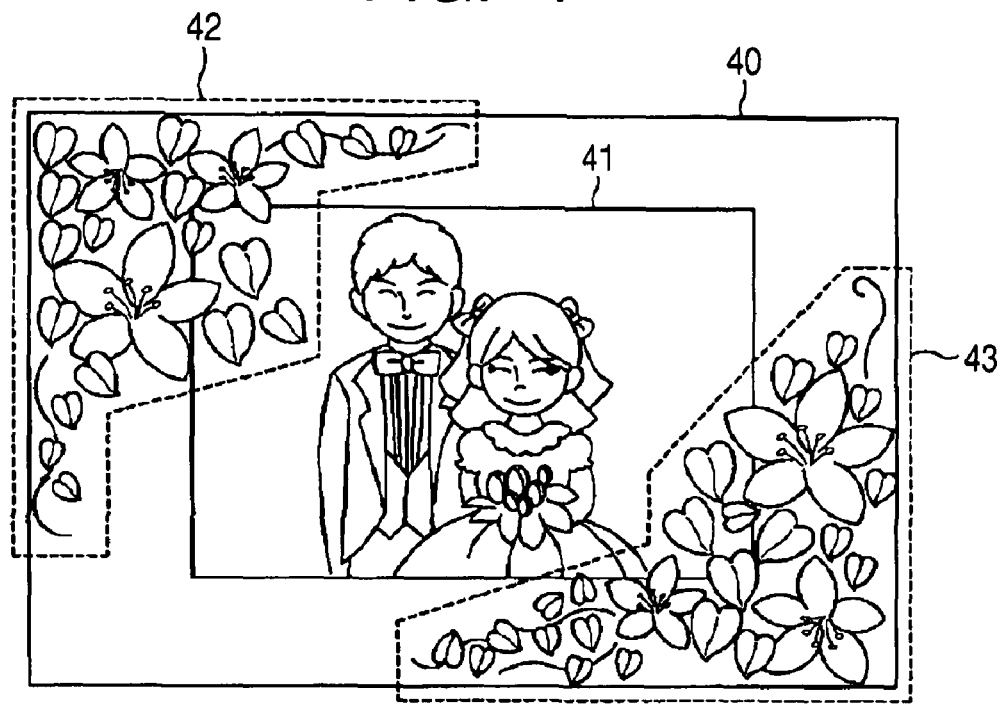
FIG. 4 is an illustration showing an example of an edited image obtained by performing an editing process in the recommended edit mode.

In a first example, editing is performed on image data belonging to a group analyzed to have been imaged at a wedding ceremony from imaging location information. As shown in FIG. 4, the image processing section 17 disposes a piece of image data 41 in the middle of a frame 40 of the edited image data and performs a process appropriate for the imaged content thus analyzed. Specifically, an editing process is performed to dispose pieces of image data 42 and 43 representing floral patterns, which have been stored in advance in the image storing section 18, in spaces remaining in the frame 40.

Figure 5:
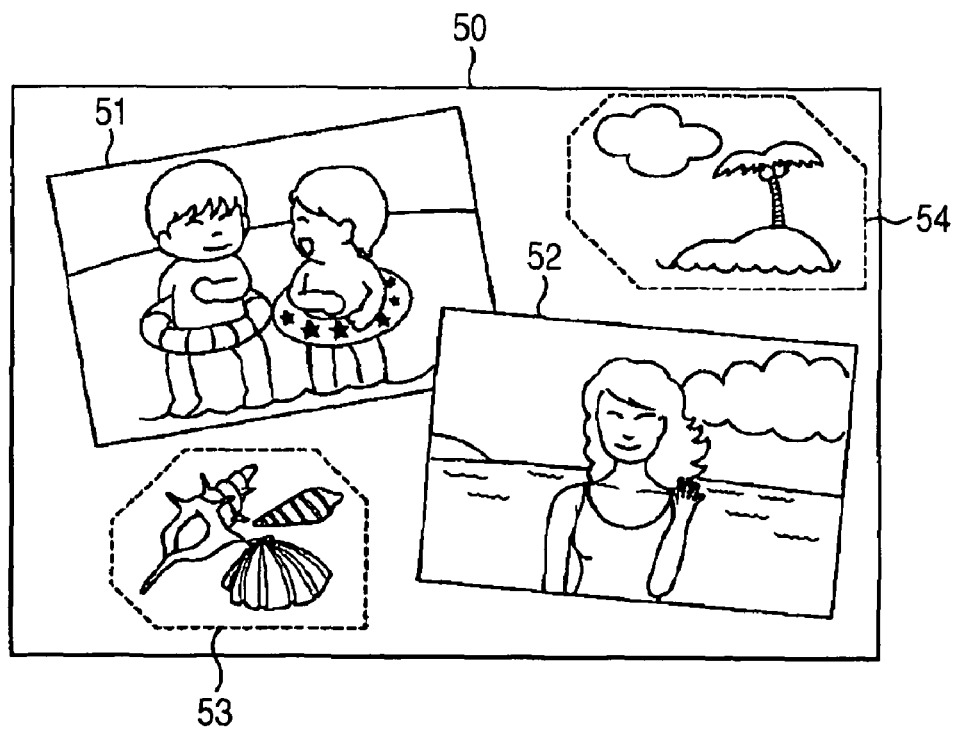
FIG. 5 is an illustration showing another example of an edited image obtained by performing an editing process in the recommended edit mode.

In a second example, editing is performed on image data belonging to a group analyzed to have been imaged at a seaside location from imaging location information and analyzed to have been imaged in summer from imaging time information. The image processing section 17 performs a process appropriate for the imaged content thus analyzed, as shown in FIG. 5. Specifically, an editing process is performed to dispose pieces of image data 51 and 52 belonging to the group in an upper right part and a lower left part of a frame 50, respectively, and to dispose pieces of image data 53 and 54 representing shells and a palm tree, which have been stored in advance in the image storing section 18, in spaces left around the above-mentioned image data.

Figure 6:
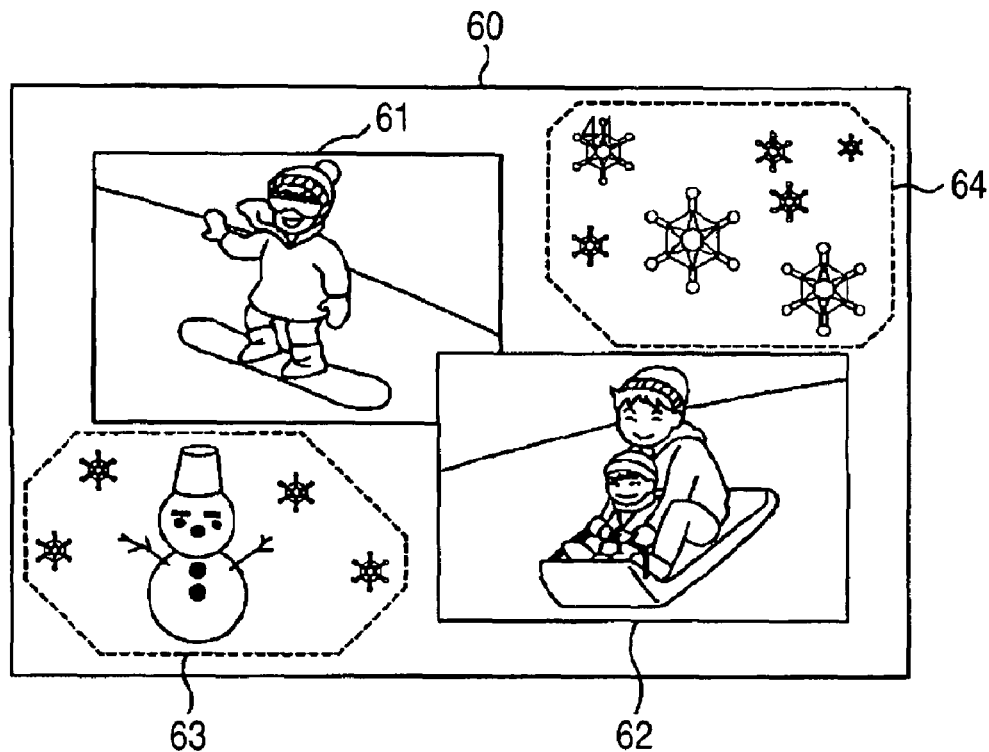
FIG. 6 is an illustration showing still another example of an edited image obtained by performing an editing process in the recommended edit mode.

In a third example, editing is performed on image data belonging to a group analyzed to have been imaged at a ski report from imaging location information and analyzed to have been imaged in winter from imaging time information. The image processing section 17 performs a process appropriate for the imaged content thus analyzed, as shown in FIG. 6. Specifically, an editing process is performed to dispose pieces of image data 61 and 62 belonging to the group in an upper right part and a lower left part of a frame 60, respectively, and to dispose pieces of image data 63 and 64 representing a snowman and snow crystals, which have been stored in advance in the image storing section 18, in spaces left around the above-mentioned image data.

Figure 7:
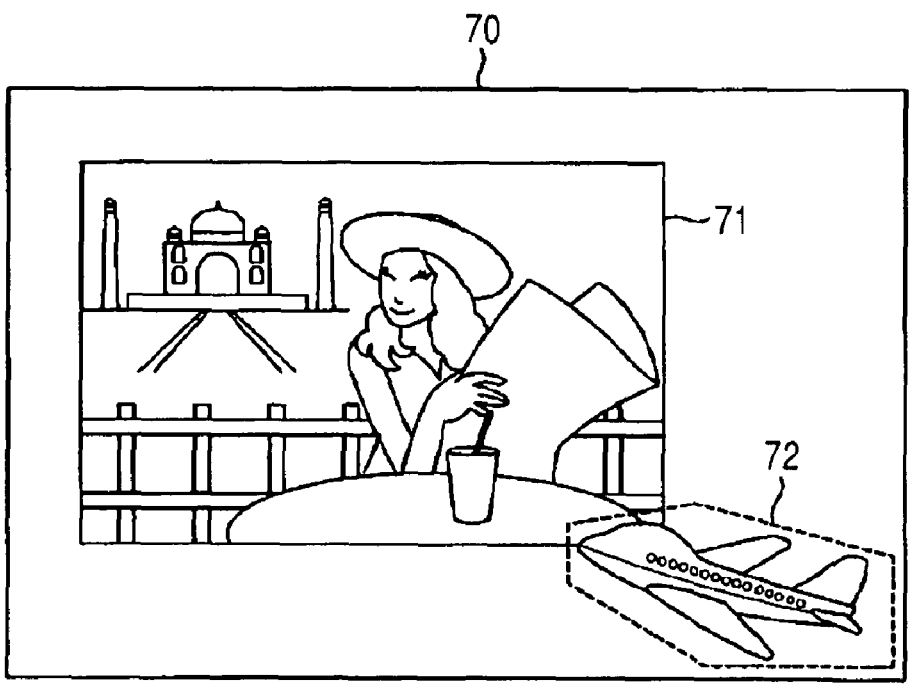
FIG. 7 is an illustration showing still another example of an edited image obtained by performing an editing process in the recommended edit mode.

In a fourth example, editing is performed on image data belonging to a group analyzed to have been imaged abroad. As shown in FIG. 7, the image processing section 17 disposes a piece of image data 71 in a position shifted toward the left and top sides from the center of a frame 70 and performs a process appropriate for the imaged content thus analyzed. Specifically, an editing process is performed to dispose a piece of image data 72 representing an airplane, which has been stored in advance in the image storing section 18.

At step S16, the control section 16 performs a process of displaying pieces of image data for display associated with the pieces of edited image data which have been edited by the image processing section 17 as shown in FIGS. 4 to 7, the pieces of image data for display being switchedly displayed one after another on the monitor 13.

At step S17, the control section 16 determines whether a printing operation is performed by a user who is looking at the display screen while the pieces of image data for display associated with the pieces of edited image data are switchedly displayed one after another on the monitor 13. The control section 16 proceeds to step S18 when a printing operation is performed and returns to step S16 when no printing operation is performed.

At step S18, the control section 16 controls the image processing section 17 and the printing process section 21 so as to print the piece of edited image data associated with the image for display which is displayed on the monitor 13 when the user performs a printing operation.

When the process of printing the edited image data is completed, the control section 16 terminates "recommended edit mode". After the process of printing the edited image data is started at step S18, the control section 16 may return to step S16 to perform the process of switchedly displaying pieces of image data for display associated with pieces of edited image data one after another. Alternatively, the control section 16 may return to the group selecting process at step S12 to perform the processes in "recommended edit mode".

In the printing apparatus 1 performing the above-described processes, the printing process section 21 is controlled to print a piece of edited image data associated with an image for display according to an operation command from a user input from the operation input section 12 while pieces of image data for display associated with pieces of edited image data are switchedly displayed one after another on the monitor 13 at step S16. Thus, image data can be easily printed with an appropriate editing process among various editing processes performed thereon according to related information (see FIGS. 4 to 7), and improved user-friendliness can therefore be achieved.

Figure 8:
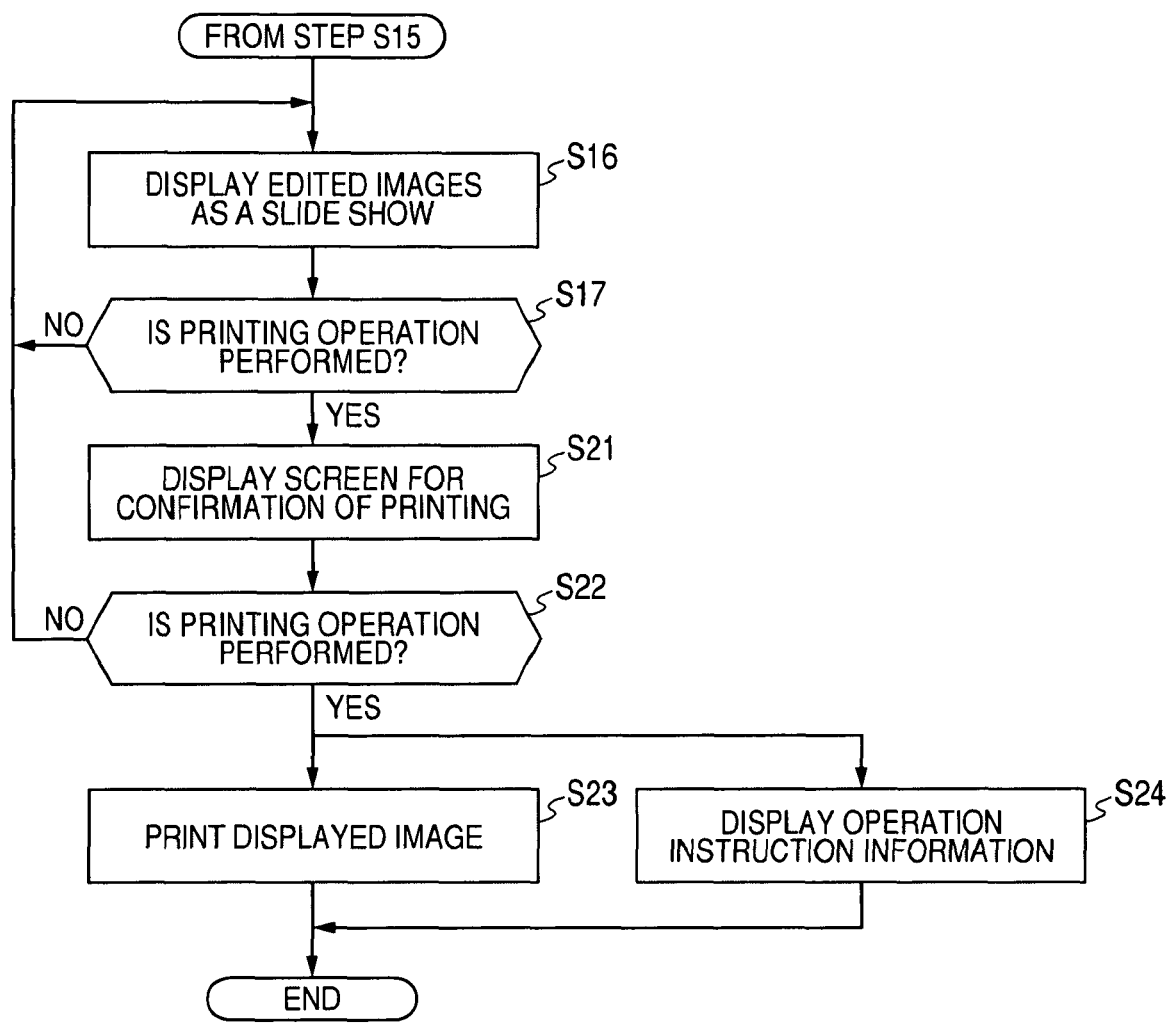
FIG. 8 is a flow chart for explaining processes performed by the printing apparatus implementing the recommended edit mode.

Some of the above-described steps in "recommended edit mode" may be replaced with processes as shown in FIG. 8.

When it is determined at step S17 that a printing operation is performed, the control section 16 may proceed to step S21. At step S21, the control section 16 displays an operation screen on the monitor 13 to allow the user to confirm the intention of printing the image data to be printed, and the process proceeds to step S22.

At step S22, the control section 16 determines whether a further action of the printing operation is taken by the user who is viewing the screen for confirming the intention of printing displayed at the previous step. When the user takes the action of the printing operation within a predetermined period of time, the control section 16 proceeds to steps S23 and S24. When the user takes no further action of the printing operation within the predetermined period of time, the process returns to step S16.

At step S23, the control section 16 controls the image processing section 17 and the printing process section 21 so as to print the piece of edited image data associated with the image data for display which are displayed on the monitor 13 when the user takes the action of the printing operation.

At step S24, the control section 16 causes the monitor 13 to display instruction information for performing the editing process applied to the edited image data, which is printed at step S23, associated with the image data for display.

When the process of printing the edited image data is completed, the control section 16 terminates "recommended edit mode".

As thus described, the printing apparatus 1 starts printing edited image data when an operation input is provided by the user after the operation screen for confirming the intention of printing is displayed at step S21. It is therefore possible to prevent the process of printing edited image data from being performed as a result of an erroneous operation of the operation input section 12 by the user.

At step S24, the printing apparatus 1 displays instruction information to allow the user to perform the editing process applied to the edited image data to be printed. It is therefore possible to provide an operating environment in which the user can easily perform the same editing process as that automatically selected by the control section 16 in "recommended edit mode" through manual operations.

It is difficult for a user to select an appropriate process from among a wide variety of editing processes through manual operations. In the printing apparatus 1, the control section 16 implements "recommended edit mode" as described above in which edited images reflecting various types of editing processes prepared in advance are displayed on the monitor 13 to allow a user to print them without complicated operations. Thus, improved user friendliness can be achieved.

Figure 9:
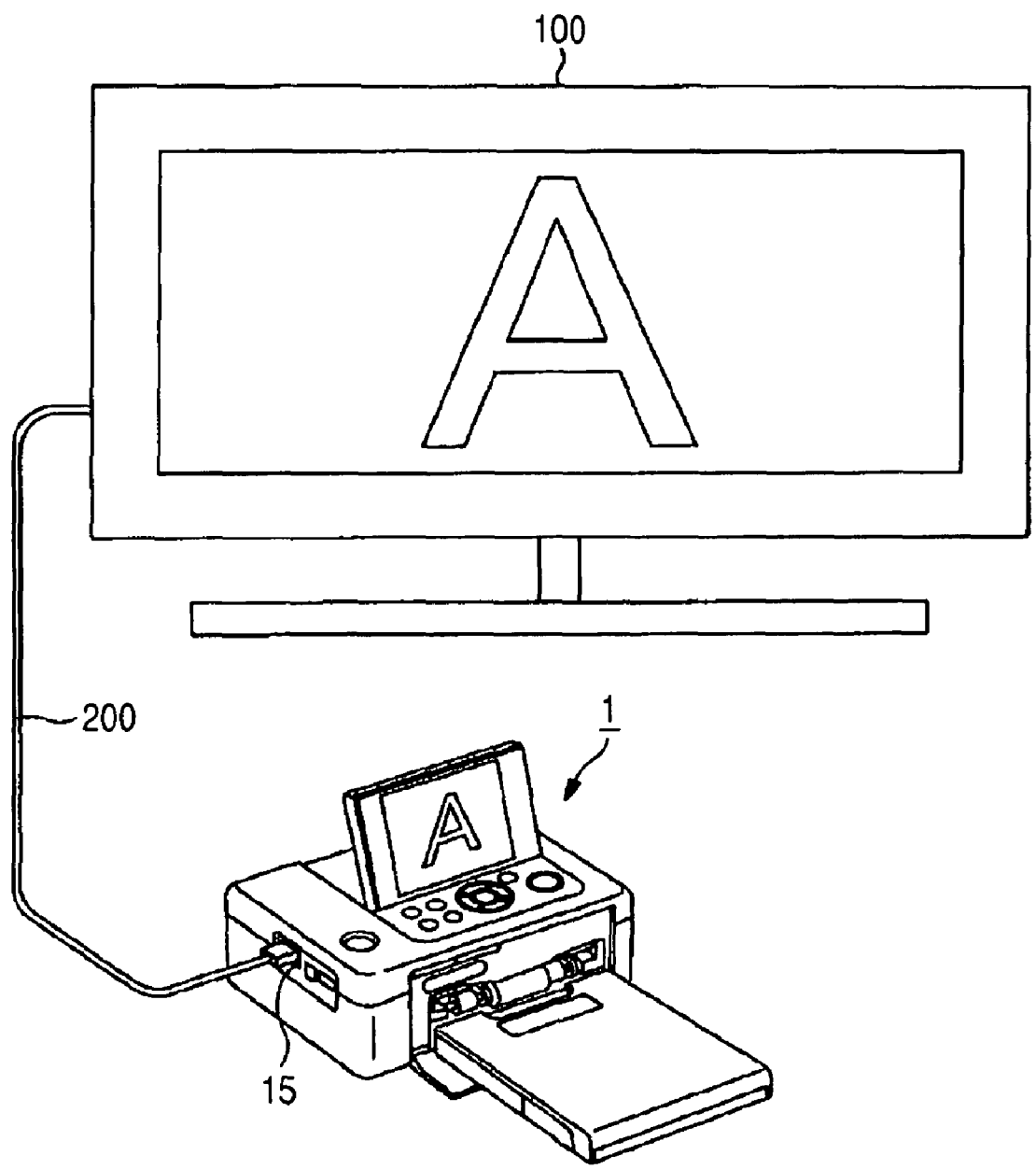
FIG. 9 is an illustration showing the printing apparatus and a display connected to the printing apparatus.

As described above, in the printing apparatus 1, image data to be printed can be output to the monitor 13 incorporated in the printing apparatus 1 to display the data on the monitor. In addition, as shown in FIG. 9, the image data can be output to be displayed on a display 100 capable of displaying images in compliance with a high definition video standard through a cable 200 connected to the video output terminal 15. Thus, the printing apparatus 1 outputs image data to be printed to the display 100 to display the image before printing the same, which allows a user to check details of the image to be printed in advance. This is advantageous in that there is less possibility of finding problems in details of an image after printing the same.

When an operation screen for operating the printing apparatus 1 as described above is used on both of the monitor 13 and the display 100, the following problem may occur. When image data for an operation screen adapted to the monitor 13 are output to the display 100 to be displayed on the same, characters of text information are displayed in a very bold form because of a great difference between resolutions of the two types of display output. On the contrary, when image data for an operation screen adapted to the display 100 are output to the monitor 13 to be displayed on the same, text information appears with blurs because characters are displayed in a fine form, and the information will therefore be unclear for a user.

The image processing section 17 of the printing apparatus 1 is configured as follows to display text information in forms of characters which can be clearly viewed by a user even when there are different destinations of display output.

Figure 10:
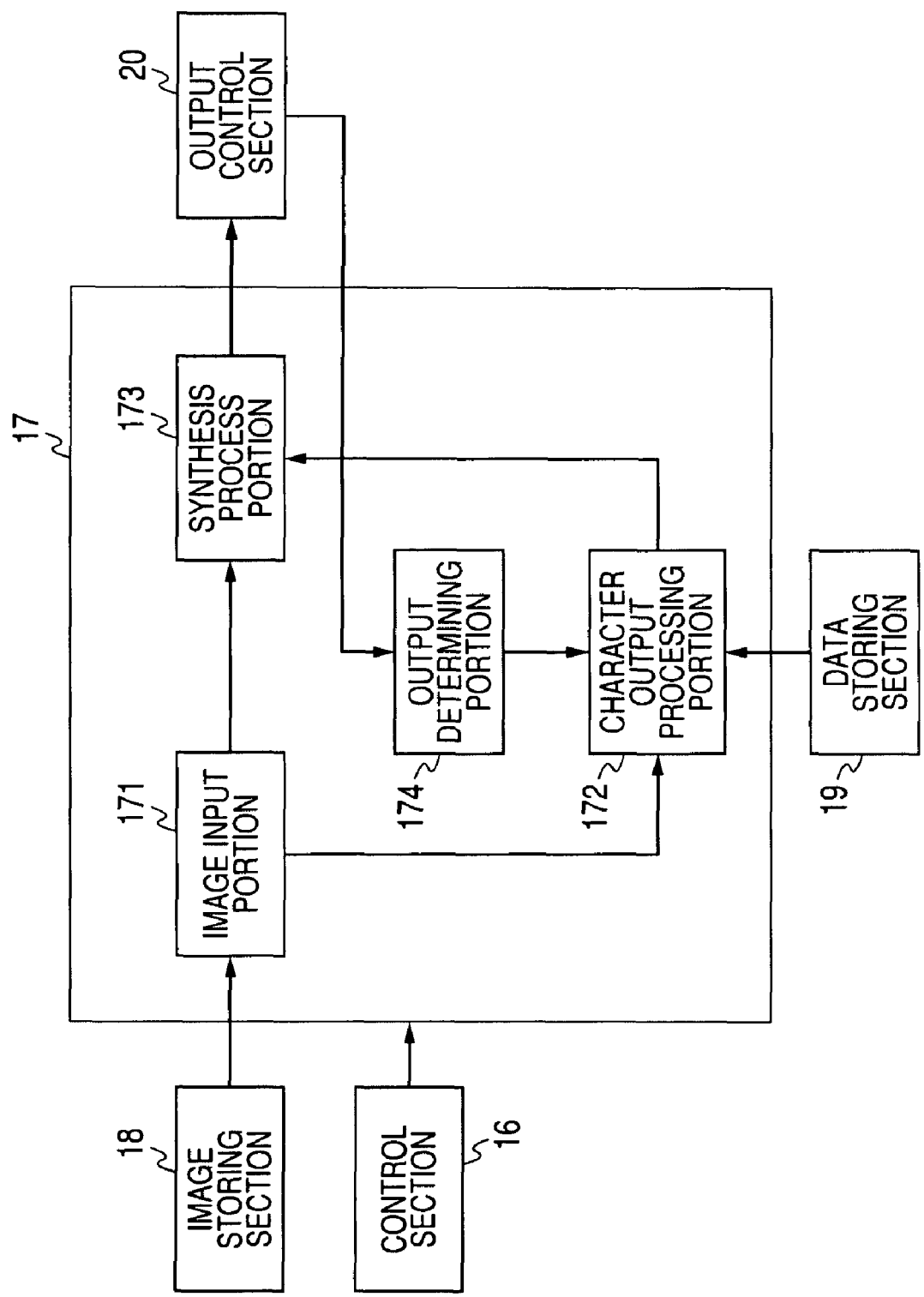
FIG. 10 is a diagram showing an internal configuration of an image processing section.

As shown in FIG. 10, the image processing section 17 includes an image input portion 171 for fetching an image from the image storing section 18, a character output processing portion 172 for processing the form of characters of character data to be added to the image data fetched by the image input portion 171, a synthesis process portion 173 for synthesizing the image data and the processed character data and outputting the resultant data, and an output determining portion 174 for determining the destination of display output from the output control section 20.

According to a control command from the control section 16, the image input portion 171 reads, for example, image data for displaying an operation screen for operating the printing apparatus 1 from the image storing section 18 and supplies the data to the character output processing portion 172 and the synthesis process portion 173.

The character output processing portion 172 reads character data to be added to the image data fetched by the image input portion 171 from the data storing section 19 and processes the form of characters of the character data thus read according to the result of determination made by the output determining portion 174 as will be described later. The character output processing portion 172 supplies the character data thus processed to the synthesis process portion 173.

The synthesis process portion 173 synthesizes the image data supplied from the image input portion 171 and the character data processed by the character output processing portion 172. The synthesis process portion 173 outputs the synthesized image data to the output control section 20.

Figure 11:
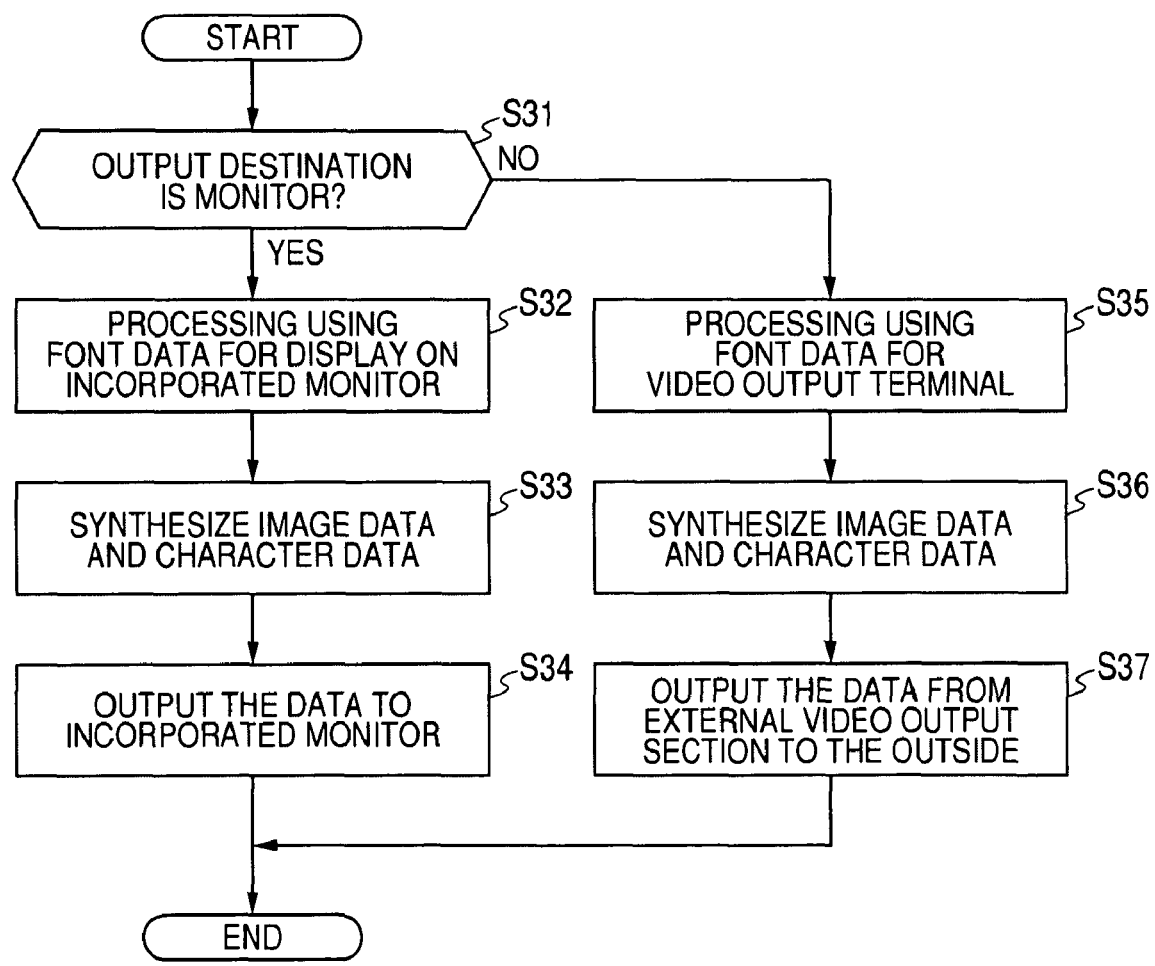
FIG. 11 is a flowchart for explaining processing performed in accordance with the resolution of display means at a destination of display output.

The image processing section 17 having the above-described configuration performs processes as shown in the flow chart in FIG. 11 in accordance with the resolution of display means used at a destination of display output.

At step S31, the output determining portion 174 determines the monitor 13 or the video output terminal 15 to be the destination to output image data for display, based on information supplied from the output control section 20 or the control section 16. When it is determined that the destination of display output is the monitor 13, the output determining portion 174 proceeds to step S32. When it is determined that the destination of display output is not the monitor 13, i.e., when the video output terminal 15 is determined to be the destination, the process proceeds to step S35.

At step S32, the character output processing portion 172 processes the character data using font data provided for display on the monitor 13 and outputs the resultant character data to the synthesis process portion 173.

Specifically, the monitor 13 has a display resolution which is very much lower than the display resolution of an output from the video output terminal 15. Therefore, the character output processing portion 172 processes the character data read from the data storing section 19 using font data of characters in a relatively bold form in accordance with the resolution of the image to be displayed at the destination. The resultant character data are output to the synthesis process portion 173, and the process proceeds to step S33.

At step S33, the synthesis process portion 173 synthesizes the character data processed at step S33 and image data supplied from the image input portion 171 and supplies the synthesized image data to the output control section 20.

Figure 12:
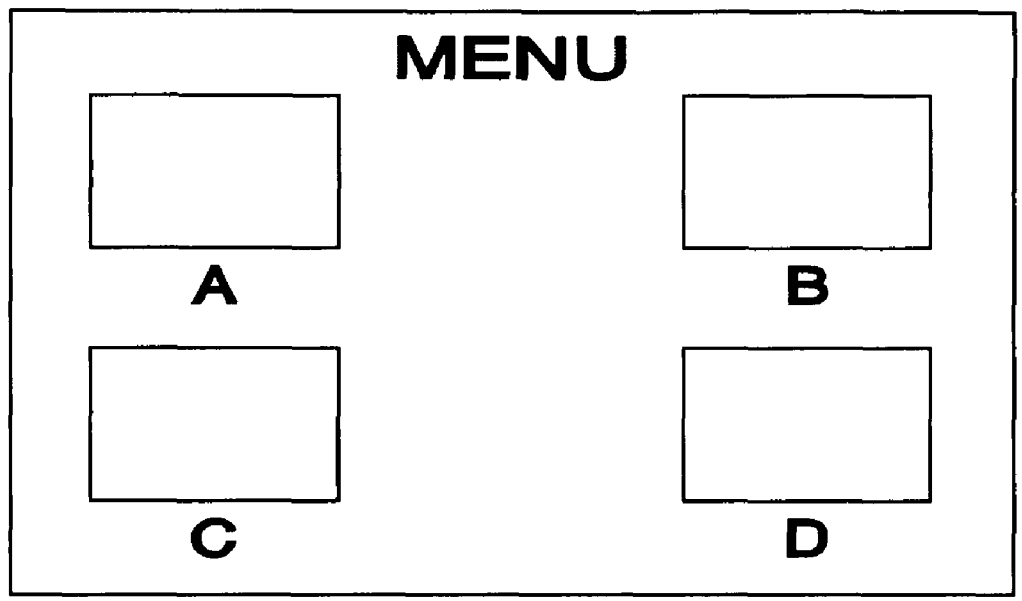
FIG. 12 is an illustration of an operation screen output on a monitor.

At step S34, the output control section 20 outputs the image data supplied from the synthesis process portion 173 to the monitor 13 to display the image. The output control section 20 performs a reduction process, i.e., pixel thinning, on the image data in accordance with the resolution of the monitor 13. The character data have been processed by the character output processing portion 172 so as to make characters relatively bold as described above. Therefore, as shown in FIG. 12, the image data can be displayed on the monitor 13 such that the image will be clearly viewed by a user without blurs of characters.

At step S35, the character output processing portion 172 processes the character data using font data for display through the video output terminal 15 and outputs the resultant character data to the synthesis process portion 173.

Specifically, an output from the video output terminal 15 has a display resolution which is very much higher than the display resolution of the monitor 13. Therefore, the character output processing portion 172 processes the character data read from the data storing section 19 using font data of characters in a relatively fine form in accordance with the resolution of the image to be displayed at the destination. The resultant character data are output to the synthesis process portion 173, and the process proceeds to step S36.

At step S36, the synthesis process portion 173 synthesizes the character data processed at step S35 and image data supplied from the image input portion 171 and supplies the synthesized image data to the output control section 20.

Figure 13:
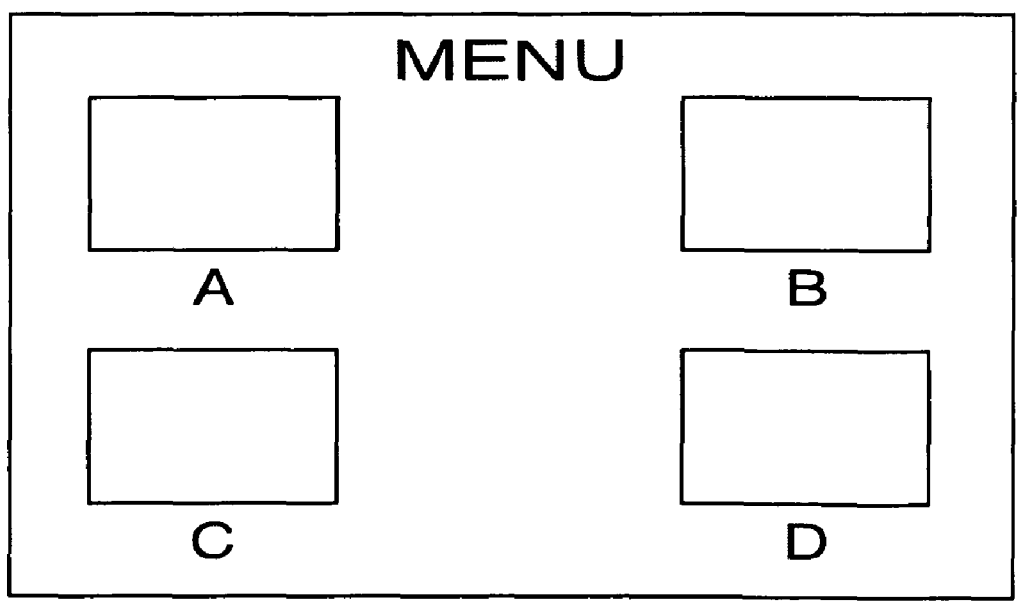
FIG. 13 is an illustration of an operation screen output from a video output terminal.

At step S37, the output control section 20 outputs the image data supplied from the synthesis process portion 173 from the video output terminal 15 to the display 100 to display the image. The output control section 20 provides the character data in a fine form which matches a fine display image in compliance with a high definition video standard output from the video output terminal 15. Therefore, the image data can be displayed on the display 100 such that the image will be clearly viewed by a user as shown in FIG. 13.

As thus described, the printing apparatus 1 processes the form of characters of character data at step S32 or S35 in accordance with the resolution of an image to be displayed at the output destination of the data. The character data which have been processed into a different form of characters are synthesized with image data, and the resultant data are output to the destination. Thus, text information can be displayed in a form of characters in accordance with the resolution of the destination of display output, and the information can therefore be clearly viewed.

The invention is not limited to the embodiments described above but can be applied to an electronic apparatus incorporating display means such as a digital still camera provided with a display by which a captured image can be checked, for example, and having an output terminal outputting image data out of the apparatus.

It should be understood by those skilled in the art that various modifications, combinations, sub-combinations, and alterations may occur depending on design requirements and other factors insofar as they are within the scope of the appended claims or the equivalents thereof.

What is claimed is:

1. An electronic apparatus having display means for displaying an image in a predetermined resolution and configured for communication with an external device, the electronic apparatus comprising:

fetching means for fetching image data from the electronic apparatus;

processing means for processing character data in a form of characters to be added to the image data fetched by the fetching means;

synthesis means for synthesizing the image data fetched by the fetching means and the character data whose character form has been processed by the processing means into synthesized data, the synthesized data including synthesized image data representing a synthesized image and synthesized character data representing synthesized characters;

output means for outputting the synthesized data out of the electronic apparatus to the external device; and output control means for outputting the synthesized data to both the display means and the output means of the electronic apparatus and to the external device, wherein the external drive device has an external display means such that the synthesized image and the synthesized characters are provided for display on the display means of the electronic apparatus and on the external display means of the external drive device in an external device resolution being different from the predetermined resolution, the output means outputs the synthesized image data for displaying the synthesized image in the external device resolution that is higher than the predetermined resolution and the processing means processes the character data into the form of characters having a thickness in accordance with the external device resolution.

2. An electronic apparatus according to claim 1, wherein the output means outputs synthesized image data having the external device resolution in compliance with a high definition video standard out of the apparatus.

3. An electronic apparatus according to claim 1, further comprising printing process means for printing image data to be printed on printing paper, wherein the output control means outputs the synthesized image data for display associated with the synthesized image data to be printed to the display means and the output means of the electronic apparatus.

4. A method of controlling an electronic apparatus having display means for displaying an image in a predetermined resolution and configured for communication with an external device, the method comprising the steps of:

fetching image data from the electronic apparatus;

processing, by processing means, character data in a form of characters to be added to the image data fetched by the fetching means;

synthesizing the image data fetched at the fetching step and the character data whose character form has been processed at the processing step into synthesized data, the synthesized data including synthesized image data representing a synthesized image and synthesized character data representing synthesized characters; and outputting the synthesized data to both the display means and to output means of the electronic apparatus and to the external device, wherein the external drive device has an external display means such that the synthesized image and the synthesized characters are provided for display on the display means of the electronic apparatus and on the external display means of the external drive device in an external device resolution being different from the predetermined resolution, the output means outputs the synthesized image data for displaying the synthesized image in the external device resolution that is higher than the predetermined resolution and the processing means processes the character data into the form of characters having a thickness in accordance with the external device resolution.

5. An electronic apparatus having a display section displaying an image in a predetermined resolution and configured for communication with an external device, the electronic apparatus comprising:

a fetching section fetching image data from the electronic apparatus;

a processing section processing character data in a form of characters to be added to the image data fetched by the fetching section;

a synthesis section synthesizing the image data fetched by the fetching section and the character data whose character form has been processed by the processing section into synthesized data, the synthesized data including synthesized image data representing a synthesized image and synthesized character data representing synthesized characters;

an output section outputting the synthesized data out of the electronic apparatus to the external device; and an output control section for outputting the synthesized data to both the display section and the output section of the electronic apparatus and to the external device, wherein the external drive device has an external display section such that the synthesized image and the synthesized characters are provided for display on the display section of the electronic apparatus and on the external display section of the external drive device in an external device resolution being different from the predetermined resolution, the output section outputs the synthesized image data for displaying the synthesized image in the external device resolution that is higher than the predetermined resolution and the processing section processes the character data into the form of characters having a thickness in accordance with the external device resolution.

* * * * *